Patented June 30, 1931

1,812,749

UNITED STATES PATENT OFFICE

ROY H. KIENLE, OF SCHENECTADY, AND WILLIAM J. SCHEIBER, OF TROY, NEW YORK, ASSIGNORS TO GENERAL ELECTRIC COMPANY, A CORPORATION OF NEW YORK

RESINOUS MATERIAL AND METHOD OF MAKING THE SAME

No Drawing. Application filed April 30, 1929. Serial No. 359,422.

This invention relates to new and useful improvements in resinous materials and the method of making the same. More specifically this invention is concerned with the manufacture of a moldable sheet material containing an aromatic amine-aldehyde condensation product incorporated therein and which may be formed on an ordinary paper making machine.

When an aromatic amine, such as aniline, is caused to react in acid solution with an excess of formaldehyde and the solution is neutralized by means of an alkali, a product is obtained which when dried is amorphous in character. This product may be subjected to heat and compression and thus molded into various shapes with or without fillers. The resulting molded material is an inert, infusible resin which is homogeneous, of great mechanical strength, and has good insulating properties.

Heretofore it has not been known that the resin, as produced by the method outlined, could be formed during the process of producing a fibrous sheet material, nor has it been known that the fibrous material having the resin produced on and around the fibres could be molded under heat and pressure so that the resin is thoroughly and firmly incorporated therein, thereby producing a hard, infusible, insoluble material, which outwardly has no characteristics of a fibrous product, but which is capable of being produced in sheet form, built up in layers or laminæ and possesses all the physical and chemical characteristics of the resin itself.

We have found that not only can the fibres of certain materials be impregnated with this substance but that when such impregnated layers are subjected to heat and pressure that they can be caused firmly to adhere to each other, thus permitting the facile production of various thicknesses of laminated material. We have also found that this moldable condensation product may be incorporated in an advantageous way in the material impregnated by causing the condensation product to be formed on and around by the fibres of the material. This may be conveniently carried out in apparatus suitable for the production of fibrous material, such, for example, as is used in ordinary paper manufacture. The condensation product may, for example, be precipitated in a "beater" on and around the fibre pulp, which may be of any suitable material, and thus the manufacture of a moldable product is combined with the economics of paper manufacture. The resulting product may be molded under heat and pressure.

The following will serve as an example of the process. It is to be understood, however, that we do not limit ourselves to the exact proportions or amounts of substances employed, or the exact figures given in the examples.

Aniline, hydrochloric acid, and formaldehyde are allowed to interact in a suitable container in the following proportions:
Water 15,000 pounds.
Aniline 920 pounds.
Hydrochloric acid (36%) 990 pounds.
Formaldehyde (38.8%) 912 pounds.

The ordinary paper mill beater has been found to be an excellent reaction chamber, although a separate chamber could be used. The aniline and water are first mixed together, then the hydrochloric acid is added and the temperature adjusted to about 28° C. The formaldehyde solution then is run in as rapidly as possible. The temperature rises usually to 35 or to 40° C. In no case is the temperature allowed to rise above 40° C. If it approaches 40° C. cold water is immediately added. Within an hour a clear red liquor is obtained, indicating that the reaction has proceeded in a proper manner.

The pulp is now furnished to the beater, either in the partially or completely beaten form. Rags, linen, sulfite, rope, hemp, kraft, bagasse, or any other suitable pulp can be used, or mixtures thereof. The amount of pulp used depends on the final resin content desired. A suitable amount for use is 100 pounds, calculated on dry weight basis. If the red liquor is prepared in a separate chamber it may be delivered to the beater as such.

After sufficient time has elapsed for the pulp to become thoroughly saturated with the red liquor, which time is usually about one hour, the stock is greatly diluted with water; for example, approximately 10,000 pounds of water is suitable. Then approximately 420 pounds of lime, preferably as milk of lime, are added in order to neutralize the acid present and precipitate the resin. Neutralization is controlled either electrometrically, or by following the pH, as is well understood, and is indicated by a pH of approximately 8.2. An approximate check may also be obtained by watching the color of the beater stock change from orange to white. At this point it has been found advisable to raise the temperature of the stock to about 60° C. in order to flocculate the resin. The purpose of flocculating the resin is pointed out below.

As beating proceeds samples will show under the microscope a gradual attachment and aggregation of the resin flocculates to the fibres until finally practically all of the resin is firmly fixed. This takes from 2 to 40 hours, depending on the beater, the kind of fibres used, etc.

It is to be observed that the pulp is in a hydrated condition when it is saturated with the red liquor. When the resin is caused to precipitate thereon, the conditions are such that there is a peculiar affinity between the pulp and resin particles which come down in the aqueous medium in finely dispersed form so that the resin particles attach themselves uniformly on and around the hydrated pulp fibers. It is these conditions, as outlined above, under which the resin is formed that apparently cause the resin particles to thoroughly attach themselves to the pulp fibers and in such a manner as to yield a stock which lends itself admirably to the production of a sheet material on an ordinary paper making machine, and which sheet retains therein uniformly the finely dispersed resin and hence is easily and successfully molded.

After beating, the stock is diluted to about 1% consistency and is ready for delivery to the paper making machine. Either a wet machine or a multiple cylinder machine can be used to form the paper, although the latter is preferred. The sheet pulp is dried and calendered thereby producing a paper-like sheet which is ready for pressing. The pressing operation is carried out in the usual type of hydraulic press at an average temperature of about 150° C. and at pressures of 1000 pounds per square inch or over.

Fillers other than cellulose pulp can be used with the above procedure if desired. For example, asbestos, clay, mica, and the like, may be used. In one case an excellent sheet using a wet machine which contained kraft fibre 32%, mica 36%, resin 32%, was prepared.

The proportion of resin in the pulp may vary. On some moldable paper stock produced according to this process 25 to 30% of the stock was resin and this showed good molding characteristics and quite high mechanical strength, giving a modulus of rupture of between 27,000 and 42,000 pounds per square inch. With a resin content as high as 50% a modulus of rupture of approximately 18,000 pounds per square inch was obtained.

Amines, other than aniline, may be used with formaldehyde in carrying out this process. As examples, benzidine and di-phenyl amines are mentioned. Also other aldehydes than formaldehyde may be used as for example acetaldehyde and furfural. In making such substitutions care must of course be exercised in selecting the proportions employed.

Large particles are desired in the manufacture of paper-like materials from pulp since it is easier to add them to the fibres during "beating" than it is the finely divided ones. The particle size of this resin can be increased either by causing the resin to precipitate in large flocks or by building up the particle size after it has been precipitated in a fine state. It has been found that varying sizes can be obtained by precipitating the resin at different temperatures ranging from 40° C. to 100° C. The higher the temperature at which it is precipitated the larger the particle size, but when a temperature between 50° C. and 60° C. is used the best results are obtained. Salts are occluded in the large particles of resin formed this way, making it impossible to remove them by washing and giving poor electrical properties. Where electrical properties are not important this method is excellent.

If the salts from the fine resin are washed out and the particle size is then built up by heating, which is an alternative method of flocculation as against hot precipitation, salts are not occluded in the flocculates thus giving an electrolyte-free resin. This method gives variation of size with temperature. Either method of flocculating applied to the pulp resin stock for paper manufacture has given a high retention of resin. The particular method used depends upon the grade of paper required. The application of these two methods of flocculation applies also to the manufacture of molding mixtures using fillers, such as wood flour, asbestos, and the like.

Because of the desirable properties of a molded product prepared as outlined above it forms an excellent material for the manufacture of various articles, such as laminated products, insulating tapes, gears, slot insulating materials, transformer spacers, refrigerator strips, and the like.

What we claim as new and desire to secure by Letters Patent of the United States is:

1. A sheet material comprising a fibrous substance which has incorporated with the fibres thereof the infusible condensation product of aniline and formaldehyde.

2. A sheet material composed of suitably treated fibres having incorporated therewith an infusible condensation product of an aromatic amine and formaldehyde.

3. A paper-like moldable sheet material composed of suitably treated fibres having incorporated therewith a moldable condensation product of an aromatic amine and formaldehyde.

4. A laminated sheet material composed of superposed sheets of suitably treated fibres having incorporated therewith a condensation product of an aromatic amine and an aldehyde.

5. A laminated sheet material composed of superposed sheets of suitably treated fibres having incorporated therewith a condensation product of aniline and formaldehyde.

6. The method of producing a sheet material which comprises reacting an aromatic amine with an aldehyde in aqueous acid solution to form a condensation product in solution, saturating suitably hydrated pulp with this solution, precipitating with alkali from the solution the condensation product on and around the fibres of the pulp, beating the stock so obtained, and forming a sheet therefrom on a paper making machine.

7. The method of producing a sheet material which comprises reacting aniline with formaldehyde in aqueous acid solution, to form a condensation product in solution, saturating suitably hydrated pulp with this solution, precipitating with alkali from the solution the condensation product on and around the fibers of the pulp, beating the stock so obtained and forming a sheet therefrom on a paper making machine.

8. The method of producing a moldable sheet material which consists in reacting aniline and formaldehyde in an aqueous acid medium at a temperature not exceeding 40° C. until condensation has taken place, adding suitably hydrated pulp thereto and causing said pulp to be saturated with said condensation product, adding a relatively large amount of water to dilute the mixture of pulp and condensation product, precipitating said condensation product from solution with alkali on and around the fibers of the pulp, heating to about 60° C. to flocculate the condensation product, beating the entire stock, diluting to about 1% consistency and forming a sheet therefrom on a paper making machine.

9. The method of producing a molded sheet material which comprises reacting an aromatic amine with an aldehyde in aqueous acid solution until a condensation product forms, saturating suitably hydrated pulp with said condensation product, precipitating said condensation product from solution with alkali on and around the fibers of the pulp, beating the stock so obtained, forming a sheet therefrom on a paper making machine, and heating and compressing the sheeted stock.

10. The method of producing a molded sheet material which consists in reacting aniline and formaldehyde in aqueous acid solution to form a resinous condensation product in solution, saturating suitably hydrated pulp with this solution, precipitating the product from solution with alkali on and around the fibers of the pulp, beating the stock so obtained, forming a sheet therefrom on a paper making machine, and heating and compressing the sheeted stock at a temperature of about 150° C. and a pressure of about 1000 pounds per square inch or over.

11. The method of producing a molded laminated sheet material which comprises reacting an aromatic amine with an aldehyde in aqueous acid solution to form a condensation product in solution, saturating suitably hydrated pulp with this solution, precipitating the condensation product from solution with alkali on and around the fibers of the pulp, beating the stock so obtained, forming a sheet therefrom on a paper making machine, superposing a plurality of layers of said sheeted stock, and heating and compressing the same.

12. The method of producing a molded laminated sheet material which consists in reacting aniline and formaldehyde in aqueous acid solution to form a condensation product in solution, saturating suitably hydrated pulp with this solution, precipitating the product from solution with alkali on and around the fibers of the pulp, beating the stock so obtained, forming a sheet therefrom on a paper making machine, superposing a plurality of layers of said sheeted stock, and heating and compressing same.

13. The method of producing a molded laminated sheet material which consists in reacting aniline and formaldehyde in an aqueous acid medium at a temperature not exceeding 40° C. until condensation has taken place, adding suitably hydrated pulp thereto and saturating said pulp with said condensation product, neutralizing said mixture with alkali to precipitate said condensation product on and around the fibers of the pulp, heating to about 60° C., beating the stock so obtained, forming a sheet therefrom on a paper making machine, superposing a plurality of layers of said sheeted stock, and heating and compressing at a temperature of about 150° C. and a pressure of about 1000 pounds per square inch or over.

In witness whereof, we have hereunto set our hands this 29th day of April, 1929.

ROY H. KIENLE.
WILLIAM J. SCHEIBER.

DISCLAIMER 1,812,749.—*Roy H. Kienle*, Schenectady, and *William J. Scheiber*, Troy, N. Y. RESINOUS MATERIAL AND METHOD OF MAKING THE SAME. Patent dated June 30, 1931. Disclaimer filed February 28, 1933, by the assignee, *General Electric Company*.

Hereby disclaims the subject matter of claims 1, 2, 3, 4, 5, 6, 7, 9, 11, and 12 of said Patent 1,812,749 which claims read as follows:

"1. A sheet material comprising a fibrous substance which has incorporated with the fibres thereof the infusible condensation product of aniline and formaldehyde.

"2. A sheet material composed of suitably treated fibres having incorporated therewith an infusible condensation product of an aromatic amine and formaldehyde.

"3. A paper-like moldable sheet material composed of suitably treated fibres having incorporated therewith a moldable condensation product of an aromatic amine and formaldehyde.

"4. A laminated sheet material composed of superposed sheets of suitably treated fibres having incorporated therewith a condensation product of an aromatic amine and an aldehyde.

"5. A laminated sheet material composed of superposed sheets of suitably treated fibres having incorporated therewith a condensation product of aniline and formaldehyde.

"6. The method of producing a sheet material which comprises reacting an aromatic amine with an aldehyde in aqueous acid solution to form a condensation product in solution, saturating suitably hydrated pulp with this solution, precipitating with alkali from the solution the condensation product on and around the fibres of the pulp, beating the stock so obtained, and forming a sheet therefrom on a paper making machine.

"7. The method of producing a sheet material which comprises reacting aniline with formaldehyde in aqueous acid solution, to form a condensation product in solution, saturating suitably hydrated pulp with this solution, precipitating with alkali from the solution the condensation product on and around the fibers of the pulp, beating the stock so obtained and forming a sheet therefrom on a paper making machine."

"9. The method of producing a molded sheet material which comprises reacting an aromatic amine with an aldehyde in aqueous acid solution until a condensation product forms, saturating suitably hydrated pulp with said condensation product, precipitating said condensation product from solution with alkali on and around the fibers of the pulp, beating the stock so obtained, forming a sheet therefrom on a paper making machine, and heating and compressing the sheeted stock."

"11. The method of producing a molded laminated sheet material which comprises reacting an aromatic amine with an aldehyde in aqueous acid solution to form a condensation product in solution, saturating suitably hydrated pulp with this solution, precipitating the condensation product from solution with alkali on and around the fibers of the pulp, beating the stock so obtained, forming a sheet therefrom on a paper making machine, superposing a plurality of layers of said sheeted stock, and heating and compressing the same.

"12. The method of producing a molded laminated sheet material which consists in reacting aniline and formaldehyde in aqueous acid solution to form a condensation product in solution, saturating suitably hydrated pulp with this solution, precipitating the product from solution with alkali on and around the fibers of the pulp, beating the stock so obtained, forming a sheet therefrom on a paper making machine, superposing a plurality of layers of said sheeted stock, and heating and compressing same."

[*Official Gazette April 11, 1933.*]